United States Patent Office 3,528,901
Patented Sept. 15, 1970

3,528,901
TREATMENT OF EFFLUENTS BY THE REVERSE OSMOSIS PROCESS
John F. Wallace, Didcot, and John G. Ransom, Abingdon, England, assignors to Pressed Steel Fisher Limited, Cowley, Oxford, England, a corporation of Great Britain
Filed Mar. 19, 1968, Ser. No. 714,243
Claims priority, application Great Britain, Mar. 22, 1967, 13,432/67
Int. Cl. B01d *13/00, 35/00;* C23b *13/00*
U.S. Cl. 204—181                                    2 Claims

ABSTRACT OF THE DISCLOSURE

A painting plant in which articles are coated with a water-borne paint and then water rinsed, the rinse water being conveyed back to the coating tank, the contents of which are conveyed under pressure to a reverse osmosis unit to separate water and low concentrate solutions of pigments and resins, the high concentrate solution of resins and pigments being conveyed to a filter bank, the output from which is passed back to the reverse osmosis unit or under pressure to a second reverse osmosis unit to separate still further relatively high and low concentration of pigments and resins, the circulation of the effluent continuing until separation is substantially complete.

---

This invention relates to the treatment of effluents from processing plants for coating articles with a water-borne paint.

It is known to treat effluents such as contaminated aqueous solutions and mixtures by the reverse osmosis process and to treat by such process effluents from plant used for the electrodeposition of a water-borne paint by an electrophoretic process.

In one such process it is customary to rinse or spray the surface of a painted article in order to remove residual coating medium and any resin or pigment which is only partially coagulated. The effluent from the rinsing operation is waste and the disposal of such waste may involve appreciable cost.

Where the rinse or spray operation is carried out over or closely adjacent to the painting tank the rinse may be conveyed back to the tank and in such a case, the whole of the contents of the tank may be regarded as "effluent."

Such effluents are generally found to be unstable at low resin and pigment concentrations and at the operating pH values and hence cannot be treated with certainty for removal of the contaminants.

A known process for treating effluents from a painting plant requires the effluent to be brought into contact with a semipermeable membrane which is porous to water molecules but impermeable to large molecules, the effluent being pressurised to cause the water in the effluent to pass through the membrane. This treatment provides for the disposal of the effluent and enables a concentrated solution of resin and pigment to be recovered for further use.

The object of the invention is to provide a process for the treatment of effluents from a painting plant particularly one using the electrophoretic process of coating which avoids waste, and which ensures substantially complete removal of the resins and pigments by preventing their uncontrolled precipitation from the unstable effluent.

According to the invention a process for the treatment of effluents from a painting plant comprises the steps of conveying effluent to a reverse osmosis unit whence that part thereof of low concentration of resins and pigments is removed and that part of high concentration is conveyed to a filter bank the output from which is returned to the reverse osmosis unit for continued treatment.

Preferably effluent from a painting plant is led to a first reverse osmosis unit whence that part thereof of low concentration of resins and pigments is removed and that part of high concentration is led to a filter bank from which it is conveyed under pressure to a second reverse osmosis unit; that part of the effluent of low concentration from the second osmosis unit being either returned to the first osmosis unit or for use in a further process and that part of high concentration being led back to the filter bank for recirculation.

Figure 1:
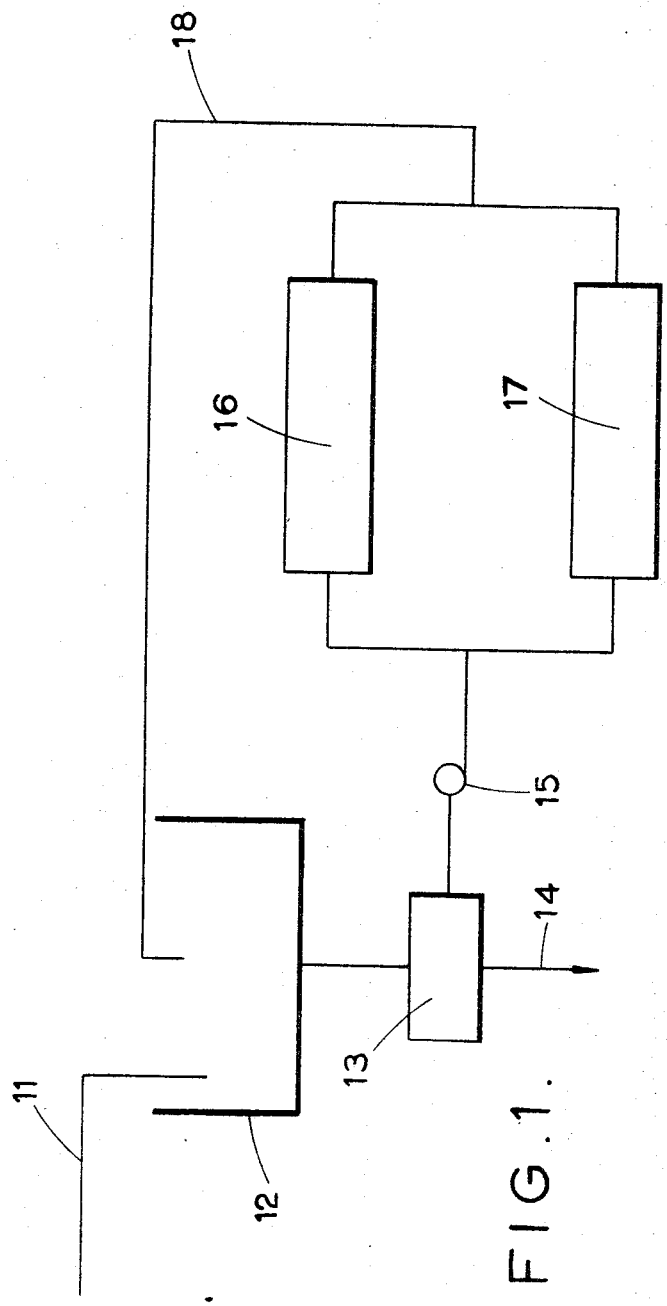
Figure 2:
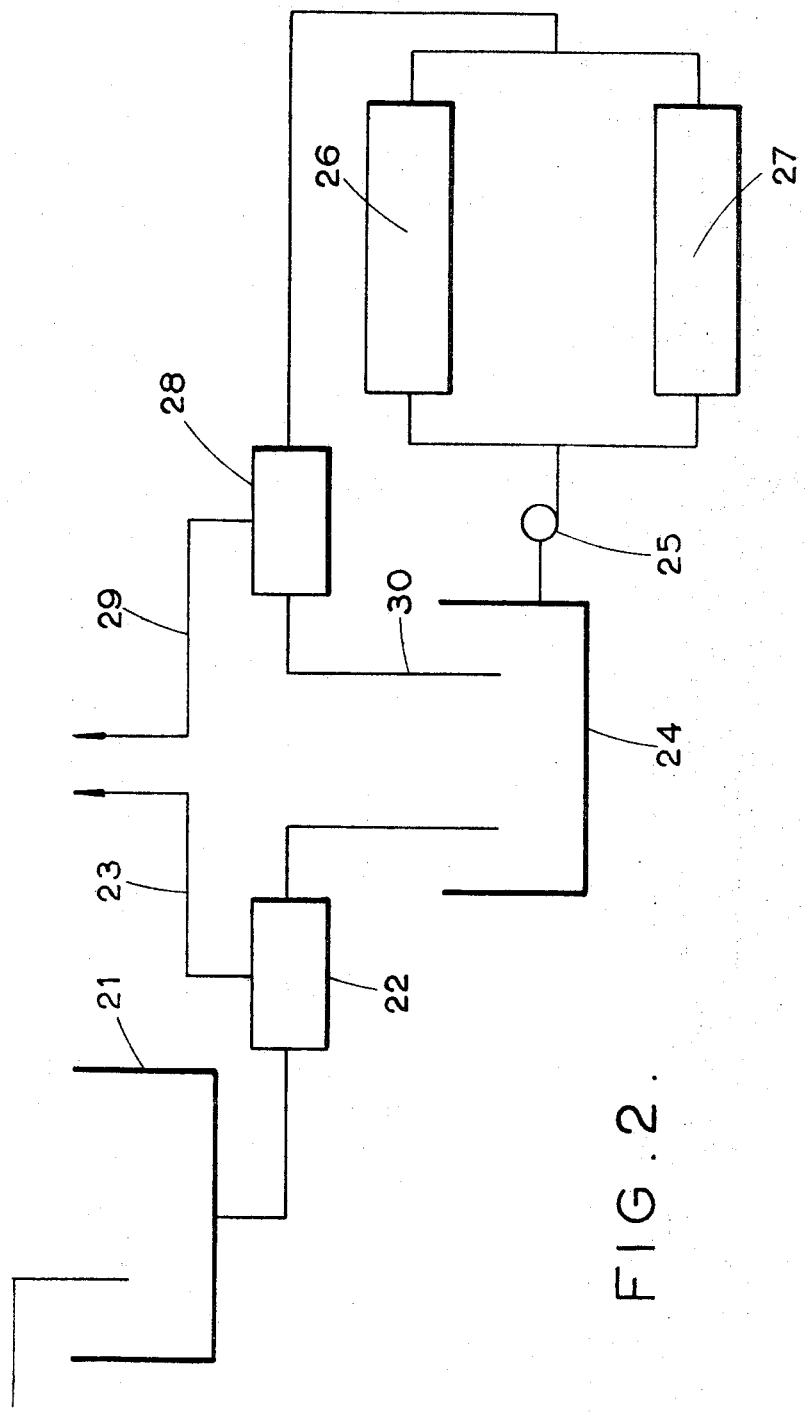

The invention is illustrated in the accompanying drawings, of which FIGS. 1 and 2 are schematic block diagrams of two exemplary forms of the invention.

As shown in FIG. 1, effluent from a painting plant is led over pipe 11 to a collecting tank 12 whence it passes to a reverse osmosis unit 13.

One example of a reverse osmosis unit suitable for this purpose comprises a semi-permeable membrane of copper ferrocyanide formed in the walls of an unglazed reinforced porous porcelain pot. Another example comprises a membrane of cellulose acetate and magnesium perchlorate dissolved in dioxan, the membrane being formed into a tube and inserted into a porous tube of glass fibre, the whole being encased in a perforated stainless steel tube.

Water, or effluent of low concentration of pigments and resins is led from the unit 13 over pipe 14 to pass to waste or to be used in a further process, e.g. a rinsing process. That part of the effluent of high concentration is pumped, by the pump 15, to a filter bank, shown as two filter beds 16 and 17 connected in parallel. Parts of the solids content is collected in the filter bank and the discharge is conveyed back over pipe 16 to the collecting tank 12 for further circulation through the unit 13.

In FIG. 2 effluent from a painting plant is led to a collecting tank 21 whence it passes to a first reverse osmosis unit 22. Water or effluent of low concentration of resins and pigments, separated out in this unit, is led by pipe 23 to waste or to be used in a further process. Effluent of high concentration passes to a second collecting tank 24 whence it is pumped by pump 25 to a filter bank, again shown as two filter beds 26 and 27 connected in parallel. Discharge from the filter bank is then passed to a second reverse osmosis unit 28 from which the low concentrate is passed over pipe 29 to waste or to be used for further processing and the high concentrate is returned over pipe 30 to the collecting tank 24 for recirculation through the filter bank.

The process is preferably continuous and results in a very high degree of purification of the original effluent.

We claim:
1. A separation process, to recover for further use such pigments and resins as arise in a painting plant for the coating of articles with a water-borne coating medium by an electrophoretic process in which a coated article is water rinsed to give an aqueous effluent containing residual pigments and resins of the coating medium, comprising the steps of conveying the effluent under pressure to a reverse osmosis unit, removing from said unit that part of the effluent having a low concentration of pigments and resins, conveying that part of the effluent having a high concentration of pigments and resins to a filter bank and returning the output of the filter bank to the reverse osmosis unit for recirculation through the filter bank until the output from the filter bank is water.

2. A separation process, to recover for further use such pigments and resins as arise in a painting plant for the coating of articles with a water-borne paint by an electrophoretic process in which a coated article is water rinsed to give an aqueous effluent containing residual pigments and resins of the coating medium, comprising the steps of conveying the effluent under pressure to a first reverse osmosis unit, removing from said unit that part of the effluent having a low concentration of pigments and resins, conveying the remainder of the effluent from said first reverse osmosis unit to a filter bank, conveying the output from said filter bank under pressure to a second reverse osmosis unit, removing from said second reverse osmosis unit that part of the effluent of still lower concentration of resins and pigments and returning said part to the first reverse osmosis unit and conveying that part of the output from the second reverse osmosis unit of high concentration of pigments and resins back to the filter bank for recirculation until the pigments and resins are recovered.

References Cited

UNITED STATES PATENTS 3,457,170   7/1969   Havens _____ 210—23

HOWARD S. WILLIAMS, Primary Examiner

U.S. Cl. X.R.

210—23